United States Patent [19]

Tazawa et al.

[11] Patent Number: 5,568,225
[45] Date of Patent: Oct. 22, 1996

[54] IMAGE INPUT DEVICE

[75] Inventors: Masashi Tazawa, Kawasaki; Toshiya Aikawa, Yokohama; Eisaku Maeda, Sakura; Nobuhiro Fujinawa, Yokohama, all of Japan

[73] Assignee: Nikon Corporation, Tokyo, Japan

[21] Appl. No.: 421,449

[22] Filed: Apr. 13, 1995

[30] Foreign Application Priority Data

Nov. 11, 1994 [JP] Japan ..................... 6-303004

[51] Int. Cl.[6] ............................ G03B 27/62; G03B 27/58
[52] U.S. Cl. ................................ 355/75; 355/74
[58] Field of Search ..................... 355/75, 35, 40, 355/50, 67, 53, 54

[56] References Cited

U.S. PATENT DOCUMENTS

| | | | |
|---|---|---|---|
| 5,396,312 | 3/1995 | Kobushi et al. | 355/75 |
| 5,453,817 | 9/1995 | Oka et al. | 355/75 |

Primary Examiner—Arthur T. Grimley
Assistant Examiner—Herbert Kerner

[57] ABSTRACT

An image input device that includes an illumination optical system to illuminate an original with light, a reading unit imaging light transmitted by the original, an original retaining unit retaining the original during a reciprocating motion of the original, and a reciprocating motion guide unit guiding the reciprocating motion of the original retaining unit. The original retaining unit has an aperture portion of a size not covered by the original. Output adjustment of the reading unit is performed in accordance with the light which passes through the portion of the aperture which is not covered by the original. A reciprocating motion guide unit is included to guide the reciprocating motion of the original retaining unit. The original retaining unit has an aperture portion having a first region through which the light of the original is caused to pass and a second region through which light is caused to pass in order for output adjustment of the reading unit. A drive unit causes a reciprocation motion of the original retaining unit in the direction of the optical axis of the light provided by the illumination optical system. An original ejection unit ejects the original and an original holder is slidably retained for insertion and removal in the original retaining unit. The original retaining unit has an aperture portion used by the image input device to perform output adjustment of the reading unit in accordance with light passing through the aperture portion.

15 Claims, 16 Drawing Sheets

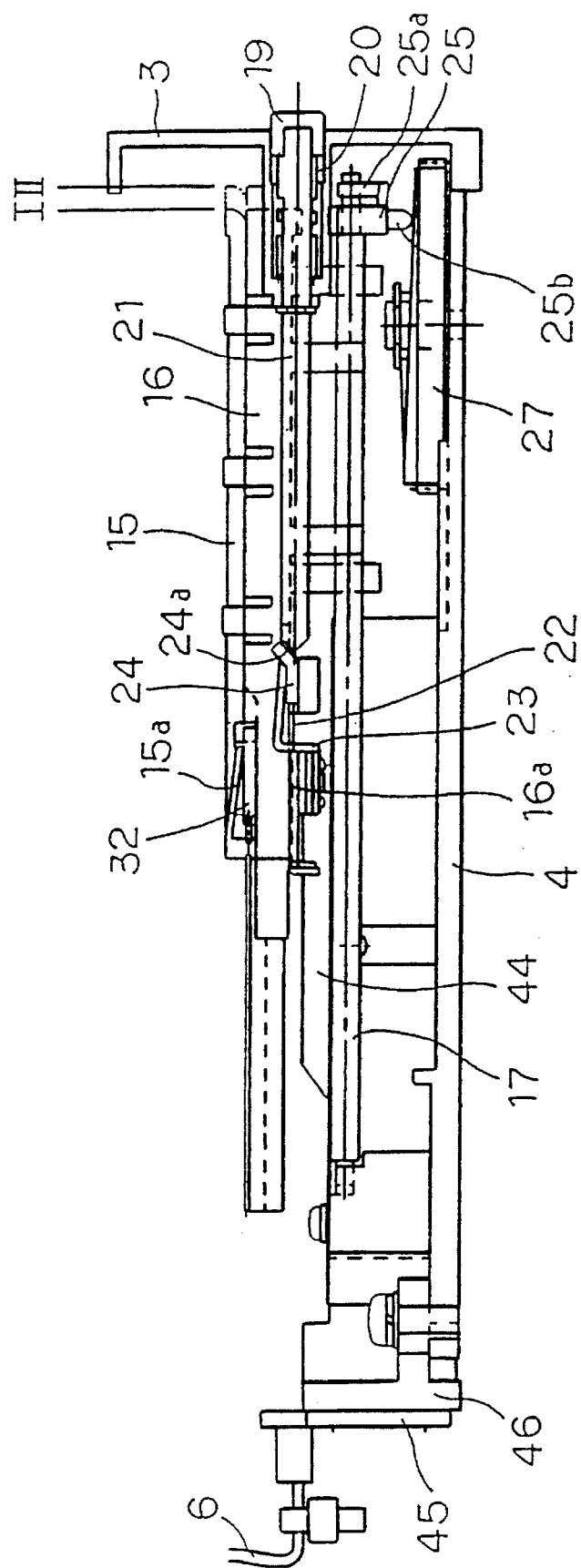

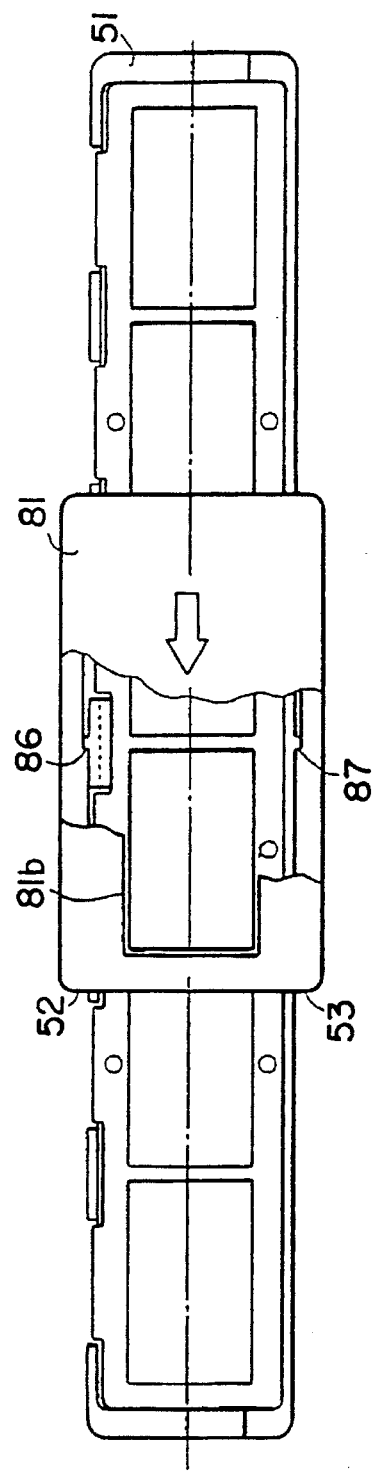

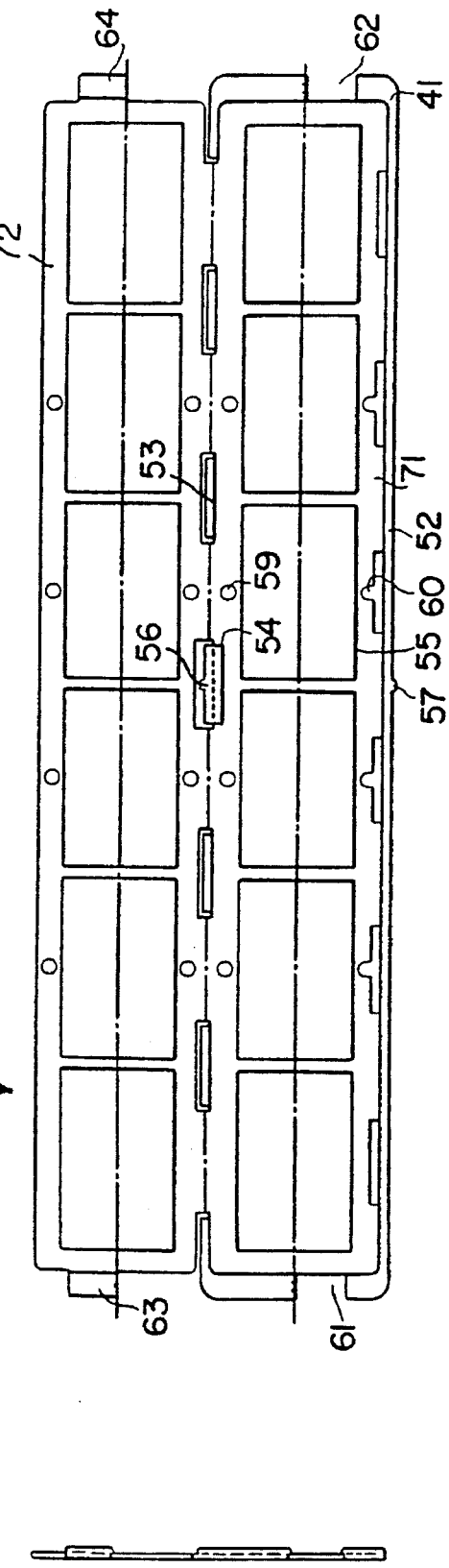

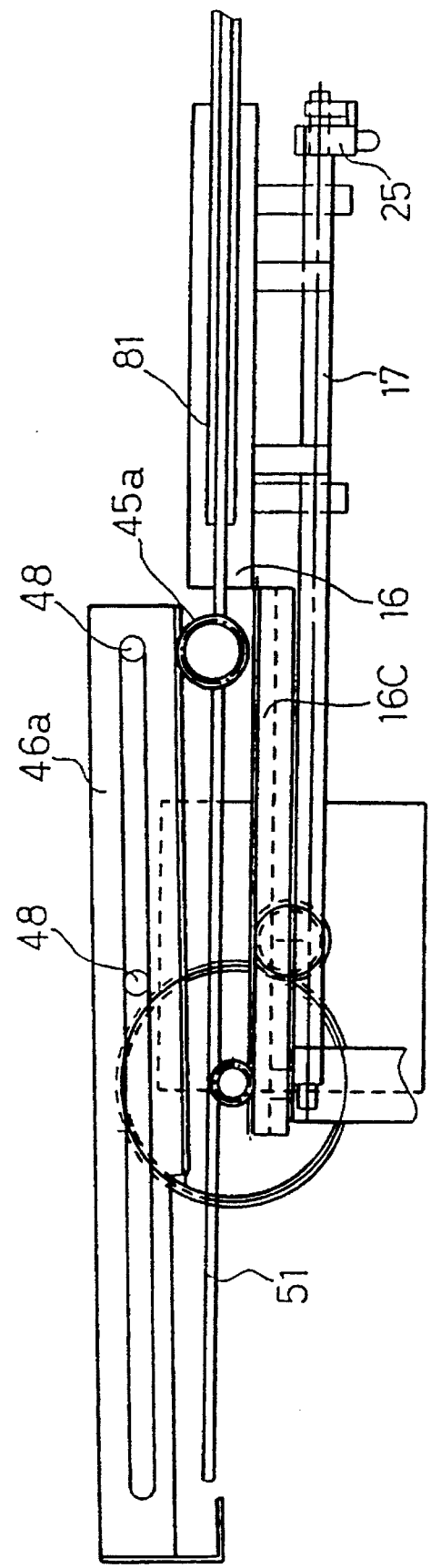

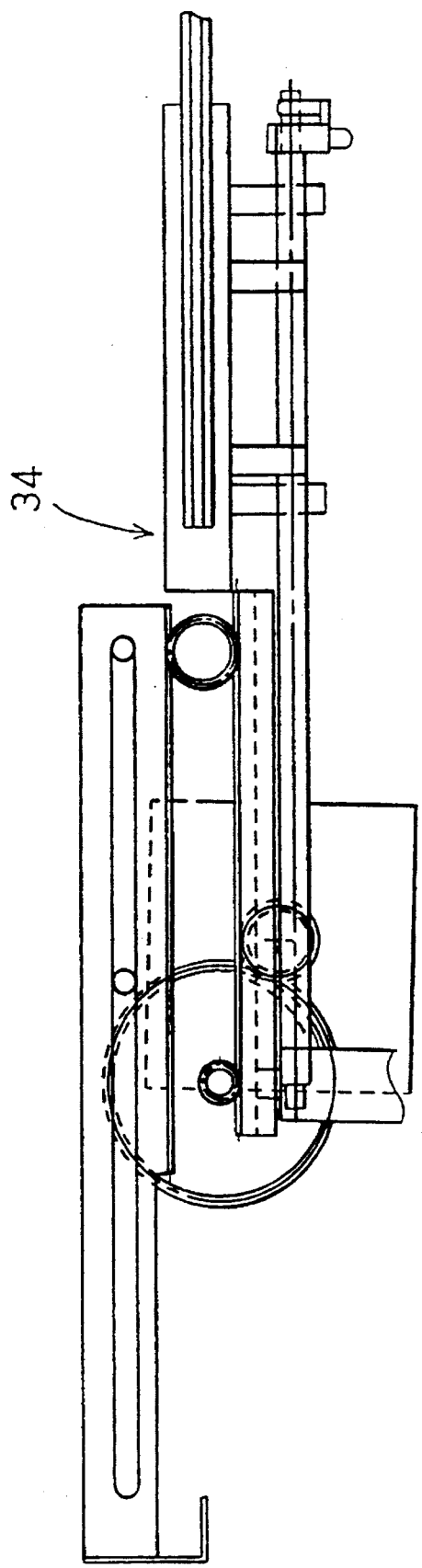

IMAGE INPUT DEVICE

BACKGROUND OF THE INVENTION

1. Field of the Invention

The present invention relates to image input devices wherein an image is formed by illuminating an image carrier such as a photographic film and the like and data is gathered in accordance therewith.

2. Description of the Related Art

Image input devices are largely divided into two classes. A first class includes those devices that include guiding units to guide illuminating light onto a transmitting original. A second class includes a scanning unit having a carriage as a retaining unit to retain a transmitting original to cause it to move, and a projection unit as a reading unit to image the transmitted light from the original on a line sensor, such as on a CCD type device.

With the aforementioned second class, focusing is caused so that the light from the illuminating unit is in the form of a line on the transmitting original. Accordingly, after such light has passed through the original it is imaged on a CCD and the transmitted light is read as a line of data. After the end of a line of data, a scanning unit performs a movement by a single line and changes the position of the transmitting original, and a readout operation is again performed. Scanning of a picture/image surface is performed by repeating reading of data and movement of the scanning unit in the aforementioned manner over a series of trials.

A typical prior art image input device is disclosed in Japanese Laid-Open Patent Publication No. 3-145881. The image input device disclosed in the aforementioned Japanese reference consists of a support body with a film insertion aperture formed in the surface. Also included therein, is a conveying unit to convey the film in a manner so that it freely reciprocates in the direction to the interior from the film insertion aperture. Additionally, an optical reading unit is disclosed and has at least one optical axis at a right angle to the conveying direction of the conveying unit.

With the prior art image input device disclosed in the aforementioned Japanese publication, a transmitting window is arranged in a conveying unit, and output adjustment (e.g., shading correction) of the reading unit is performed by reading light transmitted in the transmitting window.

The above-mentioned image input device, however, does not work well with a lengthy strip film original. More particularly, in the case where a film strip mount was used, when the film holder was inserted, the transparent window was often obstructed due to the film holder thereby requiring an output adjustment to the reading unit, which adjustment is typically not performed. Moreover, the transparent window that was not obstructed by a film holder arranged in the image input device causes the size of the device to become large as a result.

Additionally, in order for a transparent window to be arranged in a conveyance unit, the transparent window and the film as a transparent original become separately located. Because of this problem, there is a need to perform output adjustment (e.g., shading correction) of the reading unit. Accordingly, time is required to cause movement of the conveyance unit to a location at which the reading light is caused to pass through the transparent window.

SUMMARY OF THE INVENTION

Accordingly, it is therefore an object of the present invention to solve the aforementioned problems of prior art image input devices.

The present invention, taking account of the problems associated with prior art image input devices as discussed above, has as an object to allow output adjustment of a reading unit even when a film holder is inserted into an image reading unit.

Another object of the present invention is to shorten the time required for output adjustment of a reading unit, by shortening the movement time of a conveyance or original carrying member.

Other objects of the present invention are achieved by providing an image input device that includes an illumination optical system to illuminate an original with light, a reading unit that images the transmitted light from the original. An original retaining unit retains the original during a reciprocating motion. A reciprocating motion guide unit guides the reciprocating motion of the original retaining unit. The original retaining unit has an aperture portion of a size not covered by the original and which allows output adjustment of the reading unit to be performed in accordance with the light which passes through the portion of the aperture which is not covered by the original.

Also provided is an image input device that includes an illumination optical system to illuminate an original with light, a reading unit that images the transmitted light from original. An original retaining unit is provided for retaining the original retaining unit and is movable in a reciprocating manner. A reciprocating motion guide unit guides the reciprocating motion of the original retaining unit. The original retaining unit has an aperture portion having a first region through which the light from the original is caused to pass and a second region through which light is caused to pass in order for output adjustment of the reading unit.

Also provided herein is an image input device that includes an illumination optical system that illuminates an original such as a film image with light. A reading unit images the transmitted light from the original in order to read the image of the original. An original retaining unit retains the original and is movable in a reciprocating manner. A reciprocating motion guide unit is provided for guiding the reciprocating motion of the original retaining unit and, a drive unit causes reciprocation motion of the original retaining unit in the direction of the optical axis of the light. An original ejection or discharge unit ejects the original. An original holder is slidably retained in the device for insertion and removal of the original in the original retaining unit. The original holder retains the original and the original retaining unit has an aperture portion used by the image input device to perform output adjustment of the reading unit in accordance with light passing through the aperture portion. In the case that the original holder is inserted into the original retaining unit and after an ejection has been performed by the original ejector unit, output adjustment is performed of the reading unit.

BRIEF DESCRIPTION OF THE DRAWINGS

Objects and advantages of the present invention will become apparent and readily appreciated from the following description of the preferred embodiments, taken in conjunction with the accompanying drawing figures, of which:

FIG. 10 is a cross sectional diagram of the embodiment of FIG. 6 taken along D—D.

FIGS. 11(a)-11(c) are diagrams that are respectively a front view, a top view and a side view of a film holder according to a first embodiment of the present invention.

FIGS. 12(a) and 12(b) are diagrams that are respectively a front view and a top view of a film holder according to a second embodiment of the present invention.

FIG. 13 is a side view that shows another embodiment according to the present invention.

FIG. 16 is a side view that shows another embodiment according to the present invention.

DETAILED DESCRIPTION OF THE PREFERRED EMBODIMENTS

Figure 1:
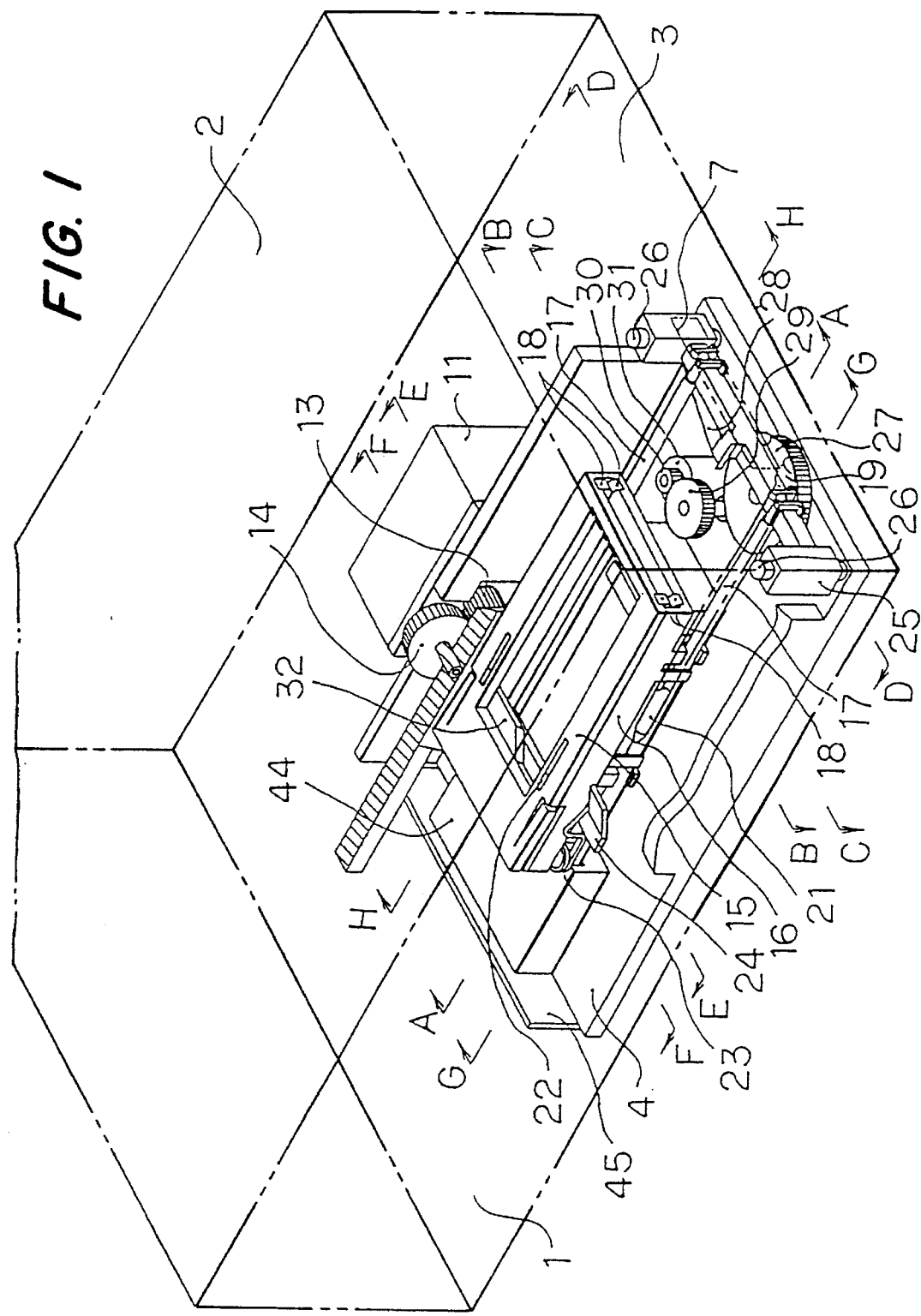
FIG. 1 is an oblique diagram of an image input device according to a preferred embodiment of the present invention.

The following description is provided in reference to the drawing figures which were briefly described above. Like parts are referred to by like reference numerals.

Figure 2:
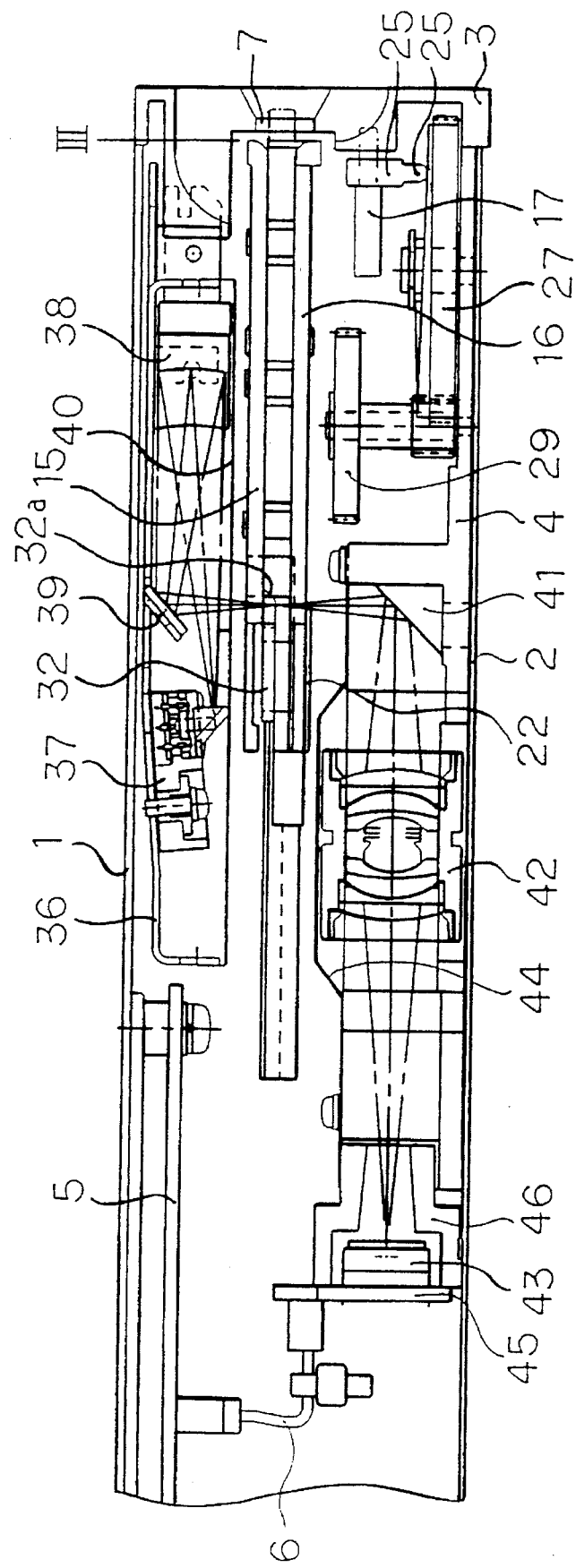
FIG. 2 is a cross sectional diagram of an image input device according to a preferred embodiment of the present invention.

Referring now to FIG. 1, therein depicted is an oblique view showing a preferred embodiment of an image input device according to the present invention. FIG. 2 is a cross-sectional view showing an embodiment of an image input device according to the present invention.

In FIG. 1, the image input device body comprises an illuminating optical system as an illuminating device that is guided based on a film as an original that transmits illumination light, a scanning unit to scan the film a moving carriage as a retaining unit to retain the film, and a reading projection optical system to image the transmitted light from the film onto a CCD. The aforementioned components are maintained in a housing.

The housing, as shown in FIG. 1, comprises of a body 1 made of diecast aluminum, an upper cover 2 made of aluminum covering the upper part of the body 1, and a front surface panel 3 made of polycarbonate that covers the front surface of body 1. Moreover, the scanning unit in body 1 comprises a mechanical body 4 and accommodates an illuminating optical unit, a projection optical unit and a main baseplate 5, which components are held in position by screws. Furthermore, the front side of upper cover 2 comes to a stop against the front surface panel 3. The rear side of the upper cover 2 is fixed to body 1 by screws (not shown in the drawing). The image reading system is covered by upper cover 2 and front surface panel 3.

Four sets of harnesses 6 connect main baseplate 5 (FIG. 2) and mechanical body 4. An insertion aperture 7 in order to insert a film mount, and a LED window (not shown in the drawings) in order to display operational states, are arranged in the front surface panel 3. Moreover, a portion of the circumference of a manual focus cam 27 projects (FIG. 1) from the front surface panel 3. Accordingly, a focusing operation can be performed from the front surface of the image input device. An eject button 19 also projects from the front surface panel 3, such that an operation of ejecting a film mount which has been inserted in the insertion aperture 7 becomes possible (this operation is discussed below). Furthermore, the front surface panel and the opposite side (rear side) surface maintain large apertures, so that connections can be made to various kinds of connectors arranged on main baseplate 5.

The scanning unit comprises a carriage unit having a film mount retaining and moving mechanism and a film focusing adjustment mechanism. Additionally, a motor unit having a motor power transmitting mechanism is provided to transmit drive forces to the carriage unit. The motor unit comprises a stepping motor 11 (FIG. 1) and a reduction gear 14 (integrated with a pinion gear 14) for speed reduction of the rotation of the stepping motor 11. Additionally, the motor unit is fixed to a motor mounting plate (not shown in the drawing). The motor mounting plate is fixed, such as by screws, to mechanical body 4.

The stepping motor 11 causes the rotation of a motor gear 13 which is maintained on a motor shaft. The motor gear 13 causes rotation of the pinion 14 via the reduction gear 14a. The stepping motor 11 rotates 0.9 degrees per step, which step corresponds to a single line of the image which is being imaged.

The carriage unit comprises a carriage 15 and a rack carriage 16. The carriage 15 is located in housing 1, such that one end is in a groove portion of mechanical body 4, and the other end is movable and is guided in a pair of guide bars 17 fitted into the focus block 25. Moreover, two respective film presser springs 18 are fixed to both side ends of the facing surfaces of the carriage 15 and the rack carriage 16. Accordingly, both side ends come into contact when a film mount is inserted between the carriages 15 and 16.

By balancing the urging forces of the film presser springs 18, even if film mounts of differing thickness are inserted between the carriages 15 and 16, the film mount is normally centrally positioned between the carriage 15 and the rack carriage 16. Because the center between the carriage 15 and the rack carriage 16 is the optical focus position, if the emulsion surface of the film becomes positioned in the center of the mount even if the mount thickness differs, it is possible to omit focusing adjustment.

A rack 16a, for example, with module 0.3 inclined teeth, is integrally formed in the rack carriage 16, parallel to the movement direction of carriage 15. A pinion gear 14 is in engagement with the inclined teeth rack 16a. The drive force from the stepping motor 11 is transmitted so as to cause movement of the carriage 15 and the rack carriage 16.

The film mount removal mechanism will next be described. In the front surface panel 3, as shown in FIG. 2, the film mount insertion aperture 7 is configured so that a film mount can be held in a space formed therein by fingers or the like from above and below the film mount. The carriage portion of the film mount receiving unit, at the time of film insertion and after image data reading, normally is such as to return to the carriage return position III (FIG. 2). The film mount insertion aperture 7 of the front surface panel 3, as shown in FIG. 2, allows the film mount to be removed from the image input device without a separate or special ejection mechanism.

Moreover, by configuring front surface panel 3 to allow a film mount to be held in a space formed therein, such a shape can be made small, and the internal space of the image input devices can be efficiently used. Moreover, as shown in FIG. 2, the relationship of the internal space of the image input device even in the case in which the insertion aperture 7 is not formed above and below the place wherein the film mount will be inserted, but is formed on only one side, either above or below where the film mount is to be inserted, the film mount can easily be removed.

With regard to illuminating optical system, as shown in FIG. 2, it comprises a sub-unit of an illumination base 36, a LED block 37, a toric mirror 38, a 40 degree mirror 39 and an illumination system cover 40. This sub-unit is fastened to the mechanical body 4 by flat-head screws.

The LED block 37 is the light source that is mounted on the illumination base 36 via an insulating sheet, and is covered by an insulating cover that is fixed by screws. The toric mirror 38 including a tubular projection at the side surface as a shaft, is rotatably mounted to the illumination base 36 and is fixed by screws after angular adjustment is performed. The 40 degree mirror 39 is adhesively fixed to a curved portion formed on the illumination base 36. The illumination system cover 40 is fixed via stop portions at two places formed on the illumination base 36. The illumination system cover 40 covers the LED block 37, the toric mirror 38, and the 40 degree mirror 39. Furthermore, a slit is arranged in the upper portion of the 40 degree mirror 39 in order for illumination light to be caused to pass therethrough towards the film mount. Moreover, outside light is screened off from penetrating into the interior of the illumination optical system by way of illumination system cover 40.

The projection optical system, as shown in FIG. 2, comprises a 45 degree reflex mirror 41, a projection lens 42, a CCD 43 and a projection system cover 44. The projection system cover 44 is located at the bottom center of mechanical body 4 and is partitioned by walls on three sides. The 45 degree reflex mirror 41 is adhesively fixed to mechanical body 4. The projection lens 42 comprises four groups of six lenses each. The four groups of lenses are symmetrically arranged and are fixed in a lens compartment by way of separating rings and compression rings. The lens compartment is fixed by screws to mechanical body 4.

The CCD baseplate on which CCD 43 is mounted is fixed to mechanical body 4 via a CCD holder 46. Moreover, projection system cover 44 is fixed by screws at the outer periphery of the portion which is partitioned by walls.

Light passing through the film original has its light path changed by 90° by means of the 45 degree reflex mirror 41, and after such a change, is imaged on CCD 43 by of projection lens 42. Moreover, CCD holder 46 performs the role of light screening and dust exclusion. Furthermore, projection system cover 44 also performs the role of light screening and dust exclusion for the entirety of the projection optical system. Also projection cover 44 also presses against the guide bars 17 of the scanning unit.

Figure 3:
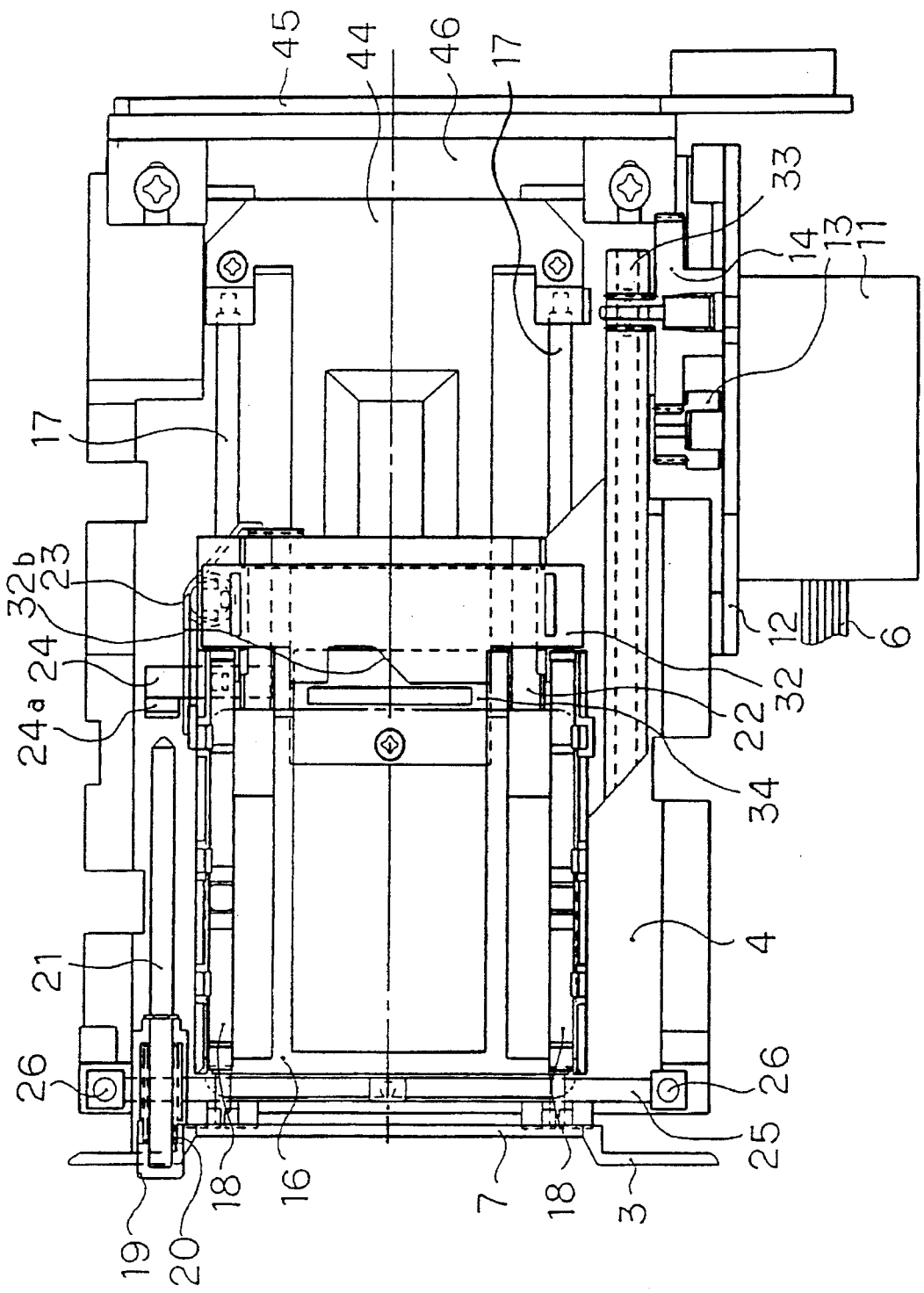
FIG. 3 is a top view diagram of an image input device according to a preferred embodiment of the present invention.
Figure 4:
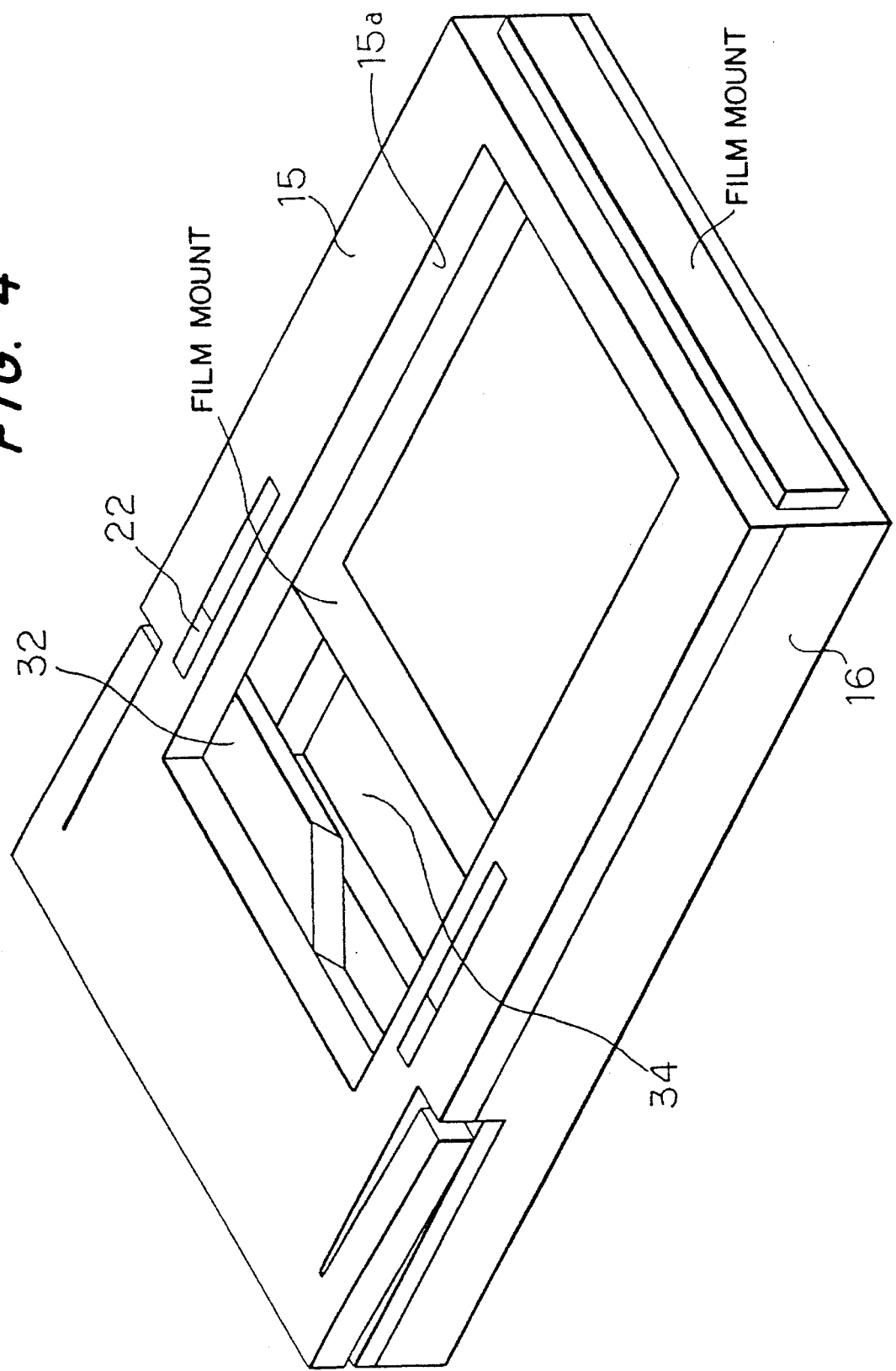
FIG. 4 is an oblique diagram of an image input device according to a preferred embodiment of the present invention.
Figure 5:
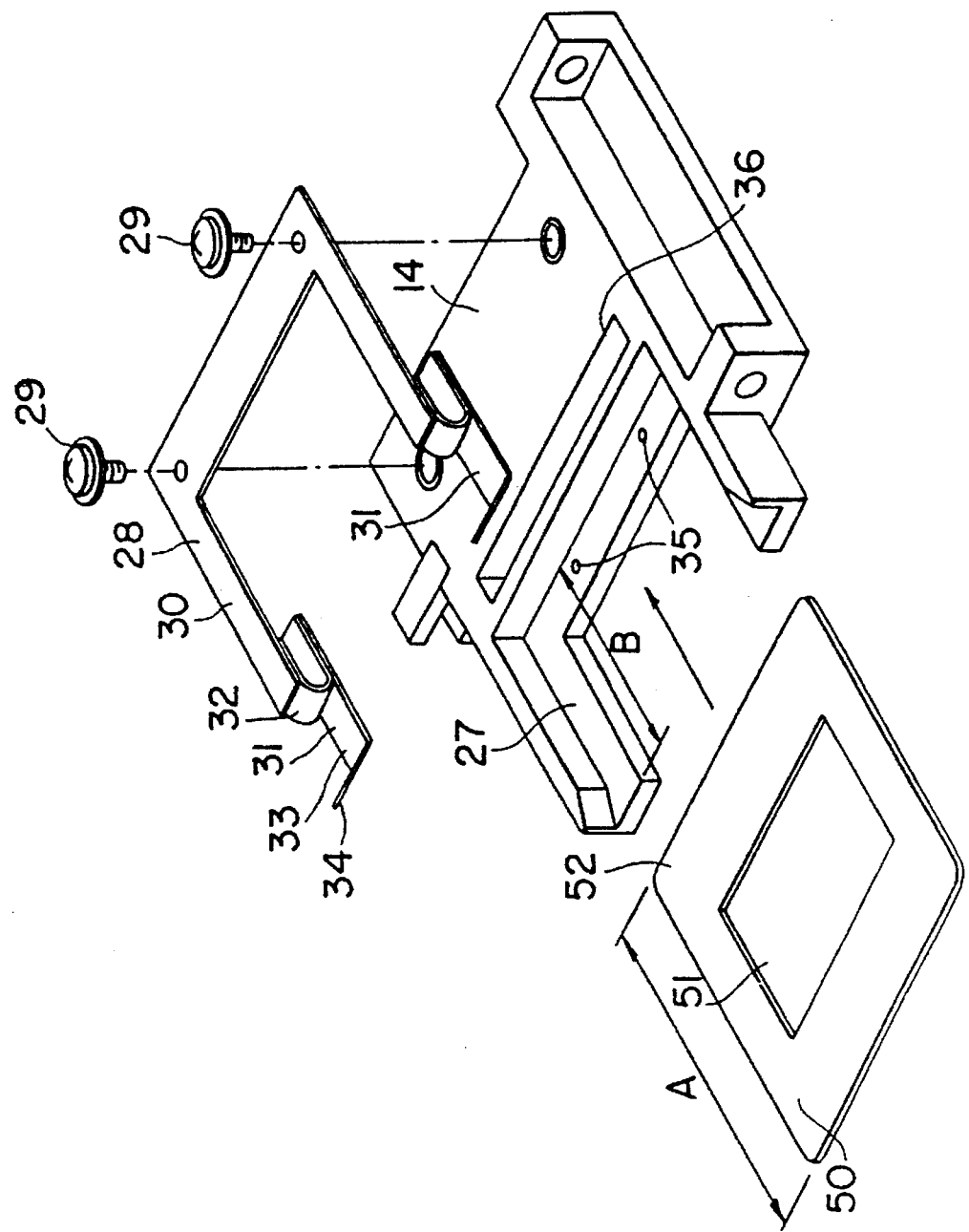
FIG. 5 is an oblique diagram of a prior art image input device.

A description will next be given of shading correction within the present preferred embodiment. As shown in FIG. 3, a transparent space 34 is maintained between the film mount and the edge detection plate 32. Space 34 is maintained by arranging an aperture portion 15a of a size which the film mount is not able to cover when the film mount is in the carriage 15 and rack carriage 16. This state is enlarged in FIG. 4. The limit of the depth of the film mount becomes limited by striking the ejection plate 12. Moreover, when the ejection plate 12 is not needed, a fixed limit may be arranged in the carriage 15 or the rack carriage 16. Namely, even in the state in which the film mount is completely inserted into the carriage 15 and in the rack carriage 16, the aperture portion 15a, which is of a size which the film mount is not able to cover, is arranged in the carriage 15 and the rack carriage 16. Accordingly, even in the state in which the film mount is completely inserted, the space 34 is formed adjacent to the film mount.

Shading correction is performed by causing motion of the carriage unit 15 such that reading light is caused to pass through space 34. Space 34 is a space which is set so as not to be covered even when the ejection plate 22 is moved into the ejection position. By performing shading correction using space 34, reliable and accurate shading correction is achieved. Such accurate shading correction is realized even when a film mount is inserted during a shading correction operation, and even when an ejection operation is performed. This result is achieved since space 34 is not covered by any other structure. Moreover, when reading a color original, by successively performing red, green and blue illumination, space 34 makes it possible to match color balance and the like by measuring the level of the amount of light for each illumination color.

In the above-described manner, because space 34 is formed adjacent to the film mount, the time to move the carriage 15 up to a location to cause reading light to pass through space 34 becomes practically unnecessary.

By way of the preferred embodiments of the present invention as hereinabove described, causing reading light to pass through a portion of an aperture which is not covered by an original, the movement time of the conveyance unit can be shortened, and in this fashion, it becomes possible to shorten the time required for output adjustment of the reading unit.

Figure 6:
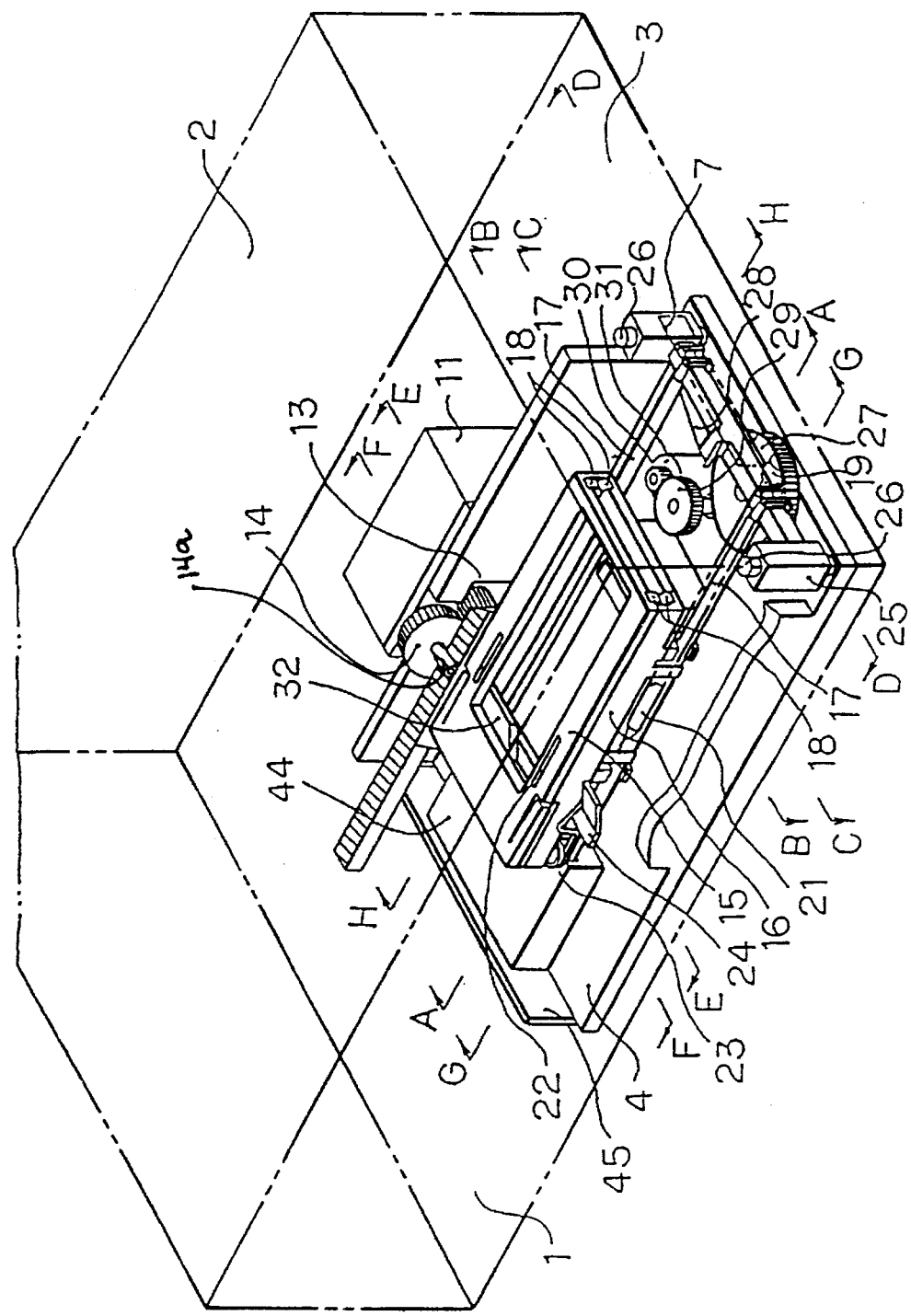
FIG. 6 is an oblique view of a first embodiment according to the present invention.
Figure 7:
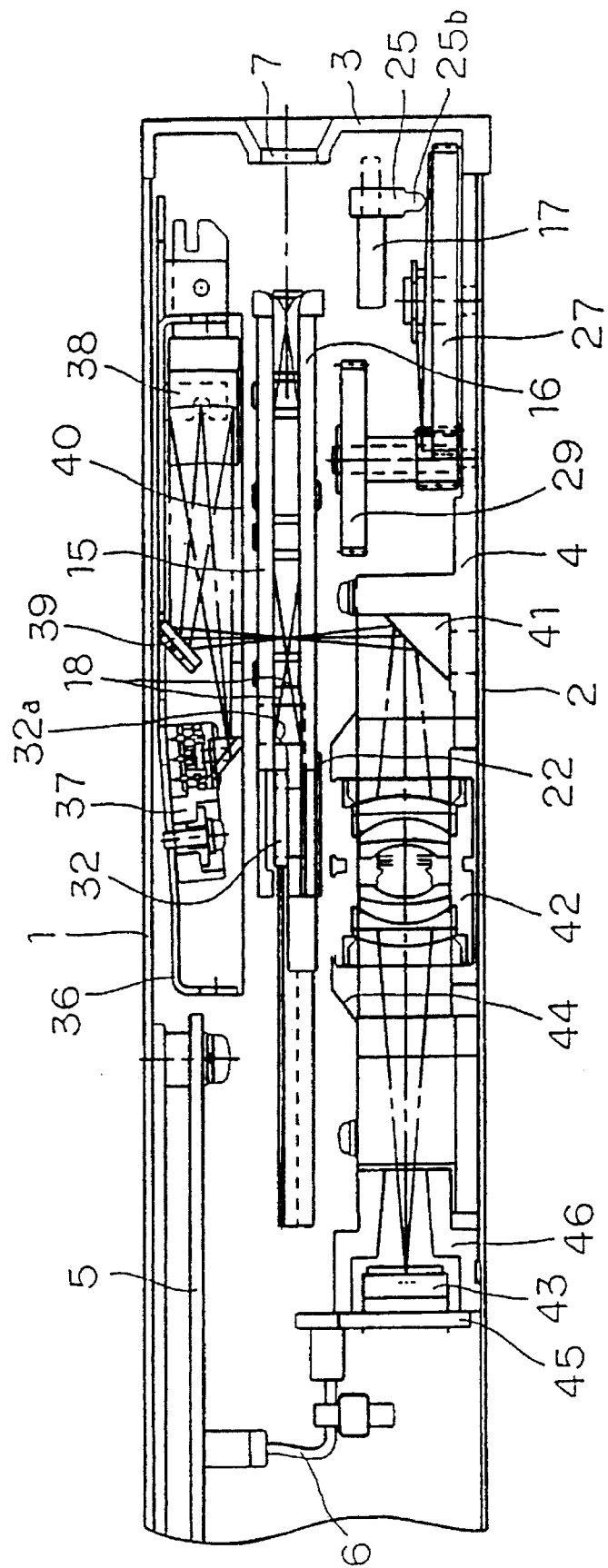
FIG. 7 is a cross sectional diagram of the embodiment of FIG. 6 taken along line A—A.

Referring now to FIGS. 6 and 7, therein depicted are oblique views of an image input device according to another preferred embodiment of the present invention.

In regard to FIG. 6, the image input device body includes an illuminating optical system as an illuminating unit that is guided in relation to a film that is to be used as an original which transmits illumination light, and a scanning unit to scan the film. A moving carriage is included as a retaining unit to retain the film and a reading projection optical system to image the transmitted light from the film onto a CCD that is maintained in a housing.

The housing, as shown in FIG. 6, comprises a body 1, an upper cover 2 covering the upper part of body 1 and a front surface panel 3 covering the front surface of body 1. In this embodiment, body 1 and upper cover 2 are made from diecast aluminum while front surface panel 3 is made from polycarbonate. However, the present invention is not to be limited by such materials, and it should be understood that other materials may be used depending on design criteria.

The scanning unit in body 1 comprises a mechanical body 4 accommodating an illuminating optical unit and a projection optical unit. A main baseplate 5 is held in position by screws. Furthermore, the front side of upper cover 2 comes to a stop against the front surface panel 3. The rear side of upper cover 2 is fixed to body 1 by screws (not shown in the drawing). The image reading system is covered by upper cover 2 and front surface panel 3.

Four sets of harnesses 6 connect main baseplate 5 (FIG. 7) and mechanical body 4. An insertion aperture 7 in order to insert a film mount, and a LED window (not shown in the drawings) in order to display operational states, are arranged in the front surface panel 3. An eject button 19 (see FIG. 8) also projects from the front surface panel 3, so that an operation of ejecting a film mount which has been inserted in the insertion aperture 7 becomes possible. Furthermore, the front surface panel and the opposite side (rear side) surface maintain large apertures so that connections can be made to various kinds of connectors arranged on the main baseplate 5. Such connectors are used to couple the image input device to external device such as computers and the like.

The scanning unit includes a carriage unit having a film mount retaining and moving mechanism and a film focusing adjustment mechanism. The scanning unit also includes a motor unit having a motive power transmitting mechanism to transmit drive forces to the carriage unit. The motor unit includes a stepping motor 11 (FIG. 6) and a reduction gear 14a (integrated with a pinion gear 14 projection) for speed reduction of the rotation of stepping motor 11. The motor unit is fixed to a motor mounting plate (not shown in the drawing). The motor mounting plate is fixed, such as by screws, to the mechanical body 4.

The stepping motor 11 causes the rotation of a motor gear 13 which is urged against the motor shaft, and causes rotation of the pinion 14 via the reduction gear 14a. The stepping motor 11 rotates 0.9 degrees per step, which step corresponds to a single line of image data.

The carriage unit includes a carriage 15 located to face a rack carriage 16. The carriage and rack carriage are separated by a predetermined gap. Additionally, one end of the carriage 15 is disposed in a groove portion of the mechanical body 4, and the other end thereof is movable and is guided in a pair of guide bars 17 fitted into the focus block 25. Moreover, two respective film presser springs 18 are fixed to both side ends of the facing surfaces of the carriage 15 and the rack carriage 16, and thereby come into contact with a film mount inserted therebetween.

By balancing the urging force of the film presser springs 18, even if film mounts of differing thickness are inserted between the carriages 15 and 16, the film mount is normally centrally positioned between the carriage 15 and the rack carriage 16. Because the central region between the carriage 15 and the rack carriage 16 is the optical focus position, if the emulsion surface of the film becomes positioned in the center of the mount even if the mount thickness differs, it is possible to omit focusing adjustment.

A rack carriage 16 with, for example, module 0.3 inclined teeth is integrally formed in the rack carriage 16, parallel to the movement direction thereof. A pinion gear 14 is in engagement with the inclined teeth rack. Accordingly, the drive forces from stepping motor 11 are to be transmitted so as to cause movement of the carriage 15 and the rack carriage 16.

An ejection mechanism will next be described. Ejection plate 22 is slidably mounted in rack carriage 16 and comes into contact with an ejector spring 23 mounted on the rack carriage 16. Ejector plate 22 is urged in the film mount discharge or ejection direction. Moreover, ejector plate 22, by way of a stop plate 24 rotatably mounted in the up and down direction in the rack carriage 16, regulates movement of the carriage 16 in the discharge direction. The opposite side of the portion of the stop plate 24, which stops the ejector plate 22, comprises an oblique surface of about 45 degrees running out from rack carriage 16.

An eject button 19 (projection), urged to the front surface by a button spring 20, is mounted in the front surface panel. An ejection rod 21 is fitted into the eject button 19 and is stopped from falling out of the image input device by an E ring in the ejection rod 21. The front end of the ejection rod 21 comprises a 45 degree conical surface.

When the film mount is inserted into the image input device, the carriage of the film mount receiving portion is returned to the carriage return position I (see FIG. 10). In the case when the carriage is present in the carriage return position I and the eject button 19 is operated, the 45° conical surface of the ejection rod 21 strikes the 45° surface 24a of the stop plate 24, and on further continued pressure of the eject button 19, the ejection plate 22 stopping portion of the stop plate 24, with the fulcrum 16e of the rack carriage 16 as a rotation center, rotates away in the direction separating from the rack carriage 16. The ejection plate 22, as disconnected from the stop, becomes movable in the film mount discharge direction, and the film mount is discharged by means of the spring force of the ejection spring 23 and the film mount thereafter can be extracted from the image input device. Moreover, an autoeject process is possible by configuring, stepping motor 11 to cause the carriage portion of the film mount receiving portion to move up to the film mount ejection position II.

A description will next be given of the focus adjustment mechanism according to the present preferred embodiment. In particular, focus adjustment is performed by causing the guide bars 17 to move up and down. One end of guide bars 17 is placed in contact with a focus block 25. The other end of guide bar 17 is placed in contact with mechanical body 4 and is caused to move about a rotation center. Parallel pins 26, fixed to mechanical body 4, fit into both ends of the focus block 25 and are slidable in the focus direction. At the center of the two guide bar arrest portions 25a of the focus block 25, there are projections 25b with hemispherical ends. These projections are brought into contact by the spring force of the focus block presser springs 28. The cam surface 27a of the focus cam 27 is formed with an inclined surface in the focusing direction. Accordingly, focusing adjustment is performed by causing the focus cam 27 to rotate. The projection 25b causes the guide bars 17 to move up and down in the focus direction without tilting.

Figure 9:
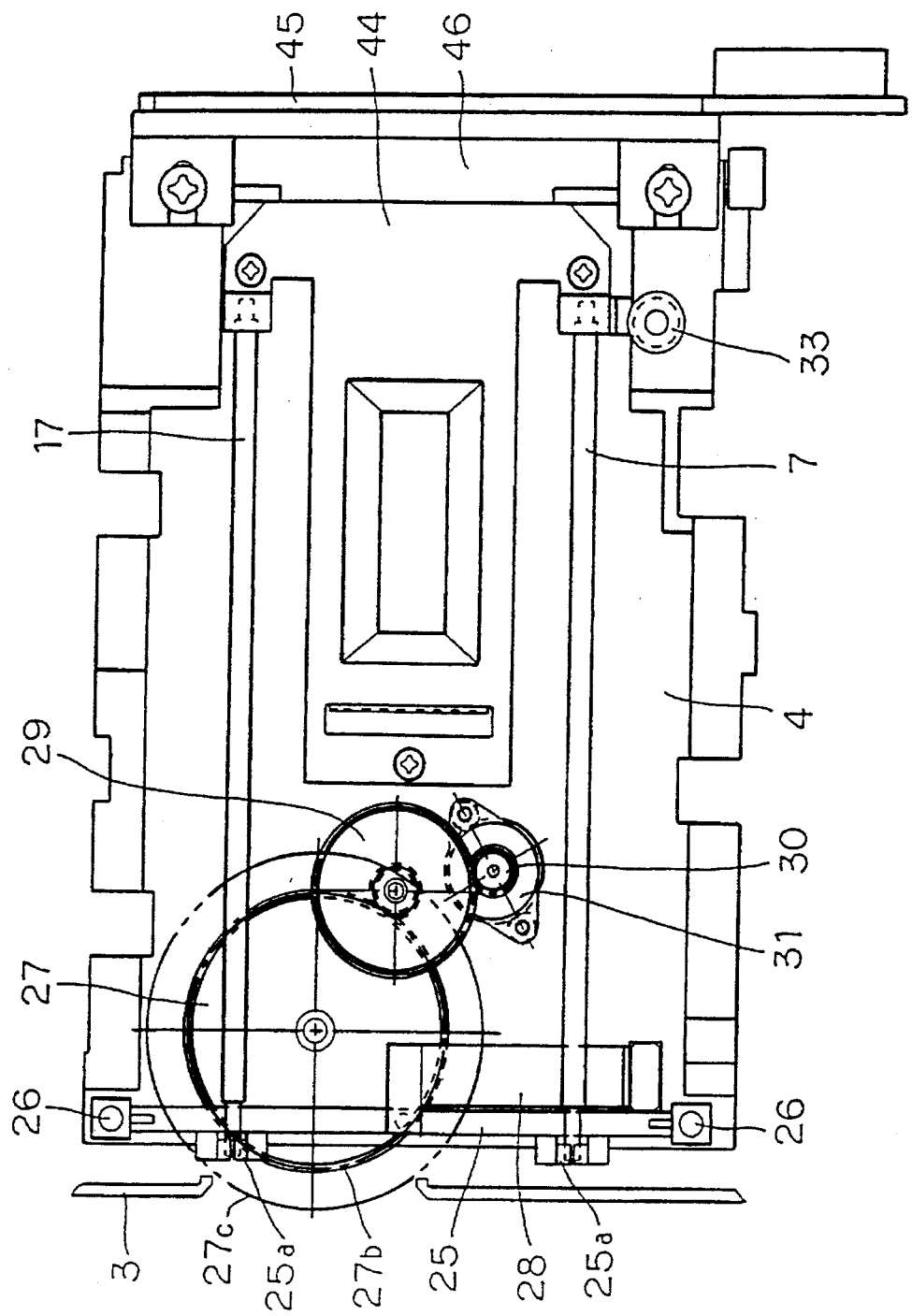
FIG. 9 is a cross sectional diagram of the embodiment of FIG. 6 taken along C—C.

A gear 27b, as shown in FIG. 9 is formed on the side surface of the focus cam 27, and is connected to an autofocus (AF) motor gear 30 via an idler gear 29. The AF motor gear 30 is disposed on the shaft of the AF motor 31, and autofocus operations become possible by the rotation of the AF motor 31.

The illumination optical system, as shown in FIG. 7, includes an illumination base 36, a LED block 37, a toric mirror 38, a 40 degree mirror 39, and an illumination system cover 40. These parts are treated as a sub-unit and are fixed to the mechanical body 4, such as by flat-headed screws.

The LED block 37 is the light source that is disposed on the illumination base 36 by an insulating sheet. An insulating cover is fixed by screws. The toric mirror 38 along with a tubular projection at the side surface thereof, is rotatably mounted to the illumination base 36, and is fixed by screws after angular adjustment. The 40 degree mirror 39 is adhesively fixed to a curved portion formed in the illumination base 36. The illumination system cover 40 is fixed via stop portions at two places formed in the illumination base 36, so as to cover the LED block 37, the toric mirror 38, and the 40 degree mirror 39. Furthermore, a slit is arranged in the upper portion of the 40 degree mirror 39, in order for illumination light to pass therethrough towards the film mount. Moreover, outside light is screened off from penetrating into the interior of the illumination optical system by way of illumination system cover 40.

The projection optical system, as shown in FIG. 7, includes a 45 degree reflex mirror 41, a projection lens 42, a CCD 43 and a projection system cover 44. The projection optical system is located in the bottom center of mechanical body 4 and is partitioned by walls on three sides. The 45 degree reflex mirror 41 is adhesively fixed to mechanical body 4. The projection lens 42 constitute four groups of six lenses each. These groups of lenses are symmetrically arranged, and are fixed in a lens compartment by way of separating rings and compression rings. The lens compartment is fixed by screws to mechanical body 4. The CCD baseplate on which the CCD 43 is mounted is fixed to mechanical body 4 via a CCD holder 46. Moreover, projection system cover 44 is fixed by screws at the outer periphery of the portion which is partitioned by walls.

Light passing through the film original has its light path changed by 90° by means of the 45 degree reflex mirror 41, and thereafter, is imaged on CCD 43 by means of the projection lens 42. Moreover, the CCD holder 46 performs the role of light screening and dust exclusion. Furthermore, projection system cover 44 also performs the role of light screening and dust exclusion for the entirety of the projection optical system, and also presses against guide bars 17 of the scanning unit.

A description will next be given of shading correction for the second preferred embodiment of the image input device described above. A film holder 51, as shown in FIG. 12, comprises a receiving portion 71 and a cover portion 72. A strip of film is inserted between receiving portion 71 and cover 72. Film holder 51 has 6 apertures 55 which correspond to frame picture portions. Mounting of a film strip is achieved by placing the film strip in the receiving portion 71. The 35 mm width side of the film is framed by embankment portions (convex portions) 52, four embankment portions 53 (convex portions) and hood portions 54. By inserting the film in the hood portions 54, the film is easily and temporarily stopped and fixed in place without floating.

After the film has been inserted into film holder 51, the cover portion 72 is closed. Connection portion 61, connection portion 62, connection portion 63 and connection portion 64 are arranged in the receiving portion 71 and the cover portion 72. When connection portion 61 and the connection portion 63 connect and the connection portion 62 and the connection portion 64 connect, the receiving portion 71 and the cover portion 72 easily become closed. The front end (right and left hand sides of FIGS. 6 and 7) of film holder 51 do not float for move, and the film is fixed in position.

After fixing the film in place, a frame to be read is arranged by inserting film holder 51 in an adapter 81. By introduction into adapter 81, the reading frame of the film becomes non-floating. The film holder 51 is inserted into a slot portion 81a (FIG. 11(c)) of adapter 81. The frame matched with the aperture 81b of the adapter 81 becomes the frame on which reading is performed. The height of the film holder 51 is set by the height of the embankment portion 52, the embankment portion 53 and the like, and the thickness of the slot 81a of the adapter 81. The width of film holder 51 and limiting members 86 and 87 are set such that there is a fitting relationship to the film holder 51. Because the adapter 81 can be one frame length shown by the arrow in FIG. 11, the adapter can be easily read from the scanner.

Moreover, the arresting or stopping of film holder 51 is achieved by projecting portions 89 (FIG. 11(c)) arranged at two places on the adapter 81, to enter locating holes 59 and 60 arranged on film holder 51. Projecting portions 56 and 57 are arranged on film holder 51. Limiting portions 86 and 87 are arranged on the adapter 81. The limiting portions 86 and 87, up to three frames from the left, set as in FIGS. 11(a)–11(c), while reading the three frames of the right-hand side, the film holder is caused to rotate 180° in a horizontal state. The connection portion 62 and the connection portion 64 side (FIG. 12) insert into the slot portion 81a of the adapter 81 and then are inserted into the film mount insertion aperture 7 of the scanner which is in the arrow direction of FIG. 11.

When film mount 51 and the adapter 81 are inserted into the film mount insertion aperture 7 of the scanner, the side surface portions 81c and 81d of the adapter 81, strike against the above-mentioned ejection plate 22, and are urged in the film mount discharge direction. Moreover, the adapter 81 may be introduced first into the scanner, followed by film mount 51.

Figure 8:
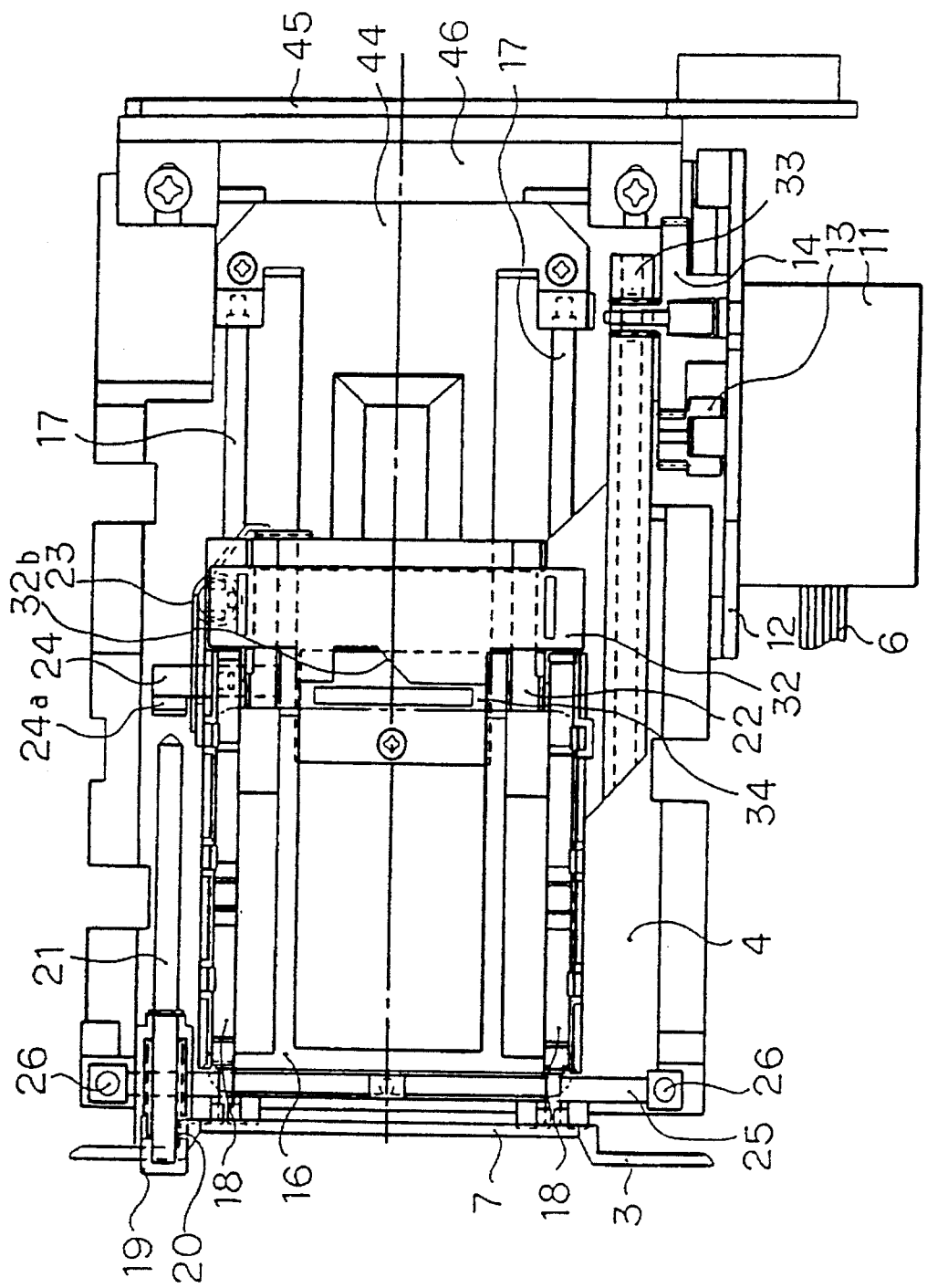
FIG. 8 is a cross sectional diagram of the embodiment of FIG. 6 taken along B—B.

A description will next be given of further details of shading correction according to the present embodiment. As shown in FIG. 8, a transparent space 34 is present between the film mount and the edge detection plate 32. Space 34 is maintained by arranging an aperture portion 15a of a size which the film mount is not able to cover, in carriage 15 and in rack carriage 16. This state is enlarged in FIG. 9. The depth of the film mount becomes limited the ejection plate 12. Moreover, when the ejection plate 12 is not needed, a fixed limit may be arranged in carriage 15 or in rack carriage 16. Namely, even in the state in which the film mount is completely inserted into carriage 15 and in rack carriage 16, the aperture portion 15a, which is of a size which the film mount is not able to cover, is arranged in the carriage 15 and in the rack carriage 16. Accordingly, even in the state in which the film mount is completely inserted, the space 34 is formed adjacent to the film mount.

Shading correction is performed by causing motion of the carriage unit such that reading light is caused to pass through space 34. Space 34 is a space which is set so as not to be covered even when the ejection plate 22 is moved into an ejection position. By doing shading correction using space 34, the shading correction is reliably performed, even when inserting a film mount during a shading correction, or even when performing an ejection operation. This is the case because space 34 is not covered. Moreover, by successively performing red, green and blue illumination through use of space 34, it now becomes possible to match color balance and the like.

In the above-described manner, because space 34 is formed adjacent to the film mount, the time to move the carriage 15 up to a location to cause reading light to pass through space 34 becomes practically unnecessary.

A description will next be given corresponding to the case in which, at the time of shading correction, the strip film holder 51 has been inserted. Because the film holder 51 is two-frames long in length compared to the film mount, during shading correction, space 34 (see FIG. 8 and FIG. 16) is covered as a result. Consequently, in the present embodiment, in the case that a film holder 51 has been inserted, the film holder 51 is ejected.

The determination of whether or not the film holder 51 has been inserted is performed by whether or not a threshold level of light has been reached. The film holder, two-frames in length, screens off the light, and the level of the amount of light becomes practically nil or non-existent. Accordingly, the presence or absence of a film holder 51 can be recognized by whether or not the light amount level reaches a threshold value.

In the case where it has been determined that a film holder 51 is found (FIGS. 13–15) is now described. In the rear portion of the image input device (the left-hand direction of FIG. 13), an ejection gear 45a is mounted (FIG. 4), normally not in toothed engagement with the rack portion 16c of rack carriage 16. A film holder ejection plate 46a is, however, in toothed engagement with the ejection gear 45a, and becomes slidable in the auxiliary scanning direction (left and right direction in FIG. 13) to guide a pin 48 mounted in the motor mounting plate 12.

Figure 14:
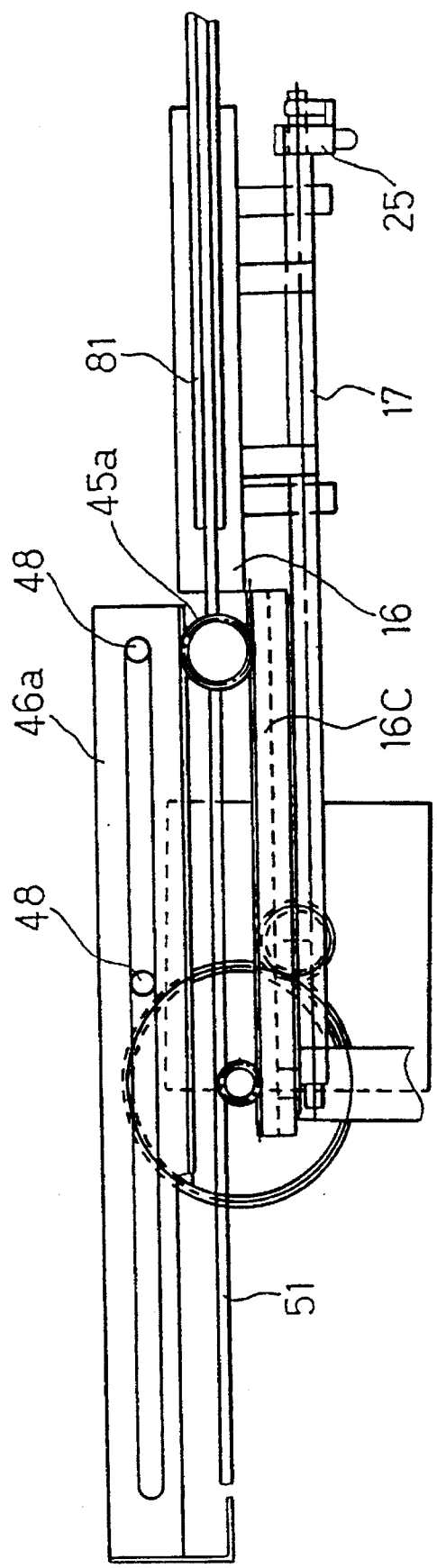
FIG. 14 is a side view that shows another embodiment according to the present invention.

In the case that it has been judged that a film holder 51 is present, rack carriage 16, using the focus adjustment mechanism, changes the location (up and down direction in FIG. 13) of the focusing direction of the rack carriage 16. As the rack portion 16C of the rack carriage 16 is in toothed engagement with the ejection gear 45a, the rack carriage 16 is caused to move in up and down direction (FIGS. 13 and 14). Normally, with focus adjustment, the rack portion 16C does not move to the extent of toothed engagement with the ejection gear 45a.

Figure 15:
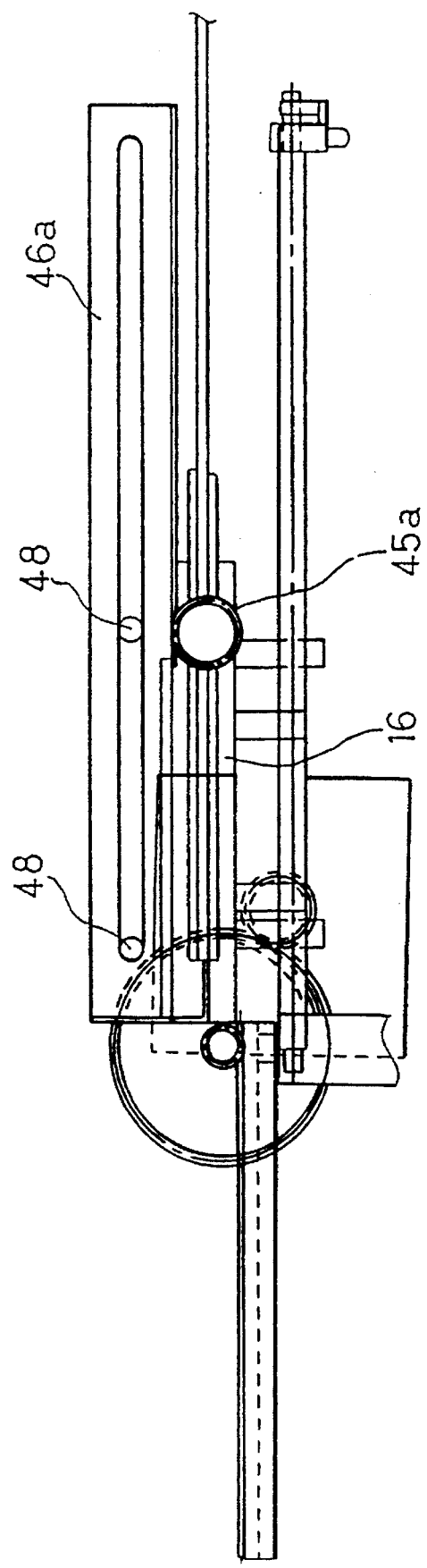
FIG. 15 is a side view that shows another embodiment according to the present invention.

The rack portion 16C and the ejection gear 45a are in a toothed engaged state when the rack carriage 16 comes into contact with the front end portion of film holder 51. When the rack carrier 16 moves further deep or width-wise (left-hand direction in FIG. 14), the film holder 51 correspondingly moves to the rack carriage 16, and continues to move until film holder 51 becomes absent in space 34 to perform shading correction. At this point in time, the motion of the rack carriage 16 to the deep side (left-hand direction of FIG. 14) is stopped (FIG. 15). Because there is nothing covering space 34, shading correction becomes possible. The rack carriage 16, moving to the front direction (right-hand direction in FIG. 15) in this state, stops in the location to perform shading correction, and shading correction is performed (FIG. 16).

Moreover, in the present embodiments, the film holder ejection plate 46a is constituted to be slidable in the auxiliary scanning direction. Because the movement of the film mount ejection plate 46a is correspondingly in the opposite direction when the rack carriage 16 moves, the ejection distance of the film holder 51 can be short. As a matter of course, the film holder ejection plate 46a may be fixed.

By way of the embodiments described above, using the focusing adjustment mechanism, the film holder ejection plate is caused to move in a forward direction and is linked to the movement of the carriage to the deep or width-wise side of a film holder.

Additionally, by way of the preferred embodiments of the present invention as described above, when an original holder is inserted during output adjustment of the reading unit, it is possible to commence output adjustment of the reading unit even if an original holder is inserted.

Although preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. An image input device comprising:

an illumination optical system to illuminate an original with light;

a reading unit imaging light transmitted from the original;

an original retaining unit retaining the original during a reciprocating motion of the original; and a reciprocating motion guide unit guiding the reciprocating motion of the original retaining unit, wherein the original retaining unit has an aperture portion of a size not covered by the original, and wherein output adjustment of the reading unit is performed in accordance with the reading light that passes through the portion of the aperture which is not covered by the original.

2. The image input device according to claim 1, wherein in order to retain the original in the original retaining unit, the original retaining unit includes an original insertion unit to insert the original in the original retaining unit, and the portion of the aperture which is not covered by the original is formed along the lengthwise side of the original insertion direction.

3. An image input device comprising:

an illumination optical system to illuminate an original with light;

a reading unit imaging light transmitted by the original so as to read an image of the original;

an original retaining unit retaining the original, the original retaining unit being movable in a reciprocating manner; and a reciprocating motion guide unit guiding the reciprocating motion of the original retaining unit, wherein the original retaining unit has an aperture portion having a first region through which the light of the original is caused to pass, and a second region through which light is caused to pass in order for output adjustment of the reading unit.

4. The image input device of claim 3, wherein the second region extends beyond the original adjacent to a widthwise side thereof.

5. The image input device of claim 3, wherein the first region is covered by the original.

6. The image input device of claim 3, wherein the second region is not covered by the original.

7. An image input device comprising:

an illumination optical system illuminating an original with light;

a reading unit imaging light transmitted from the original in order to read an image of the original;

an original retaining unit retaining the original, the original retaining unit being movable in a reciprocating manner;

a reciprocating motion guide unit guiding the reciprocating motion of the original retaining unit;

a drive unit causing reciprocation motion of the original retaining unit in the direction of the optical axis of the reading light;

an original ejection unit to eject the original; and an original holder slidably retained for insertion and removal in the original retaining unit, wherein the original retaining unit has an aperture portion used by the image input device to perform output adjustment of the reading unit in accordance with light passing through the aperture portion.

8. The image input device according to claim 7, wherein after the original holder is inserted into the original retaining unit and after ejection has been performed by the original ejection unit, output adjustment of the reading unit is performed.

9. The image input device according to claim 7, wherein the aperture portion is formed above the original relative to a long side of the original.

10. The image input device according to claim 7, wherein the aperture portion is formed next to the original in the lengthwise direction of the original.

11. The image input device according to claim 7, wherein the original unit has a first ejection member to eject the original holder, and a second ejection member to eject a film mount.

12. The image input device according to claim 9, further comprising a second drive unit to drive the original retaining unit and wherein the second drive unit causes motion of the reciprocation guide unit in the optical axis direction of the light illuminated by the illumination optical system, the second drive unit performing ejection of the original holder.

13. The image input device according to claim 7, further comprising a discriminating unit determining whether or not the original holder is inserted in the original retaining unit.

14. The image input device according to claim 7, wherein the original is a 35 mm picture.

15. The image input device according to claim 14, wherein the 35 mm picture is maintained on a film strip containing a plurality of 35 mm pictures.

* * * * *